Patented Aug. 7, 1945

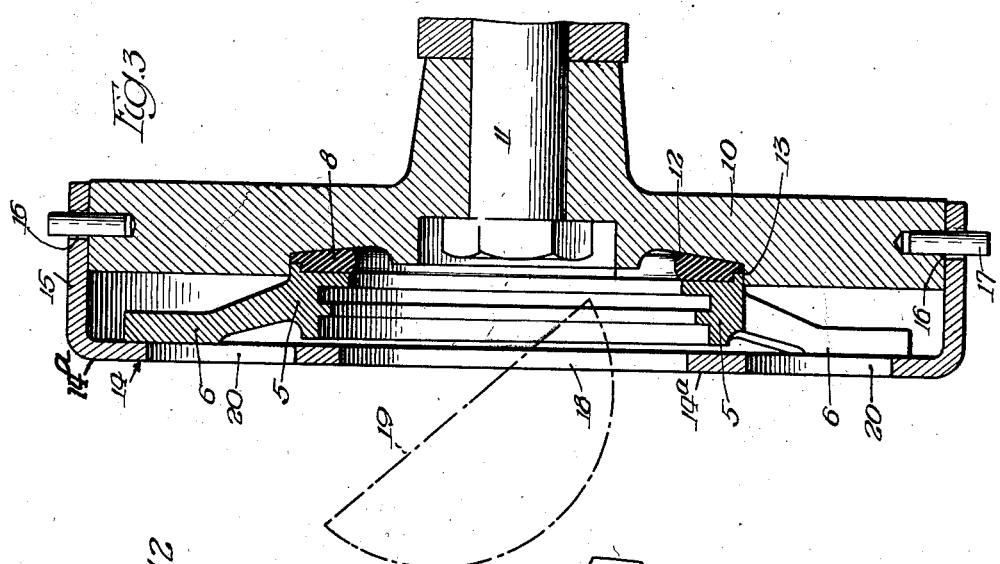
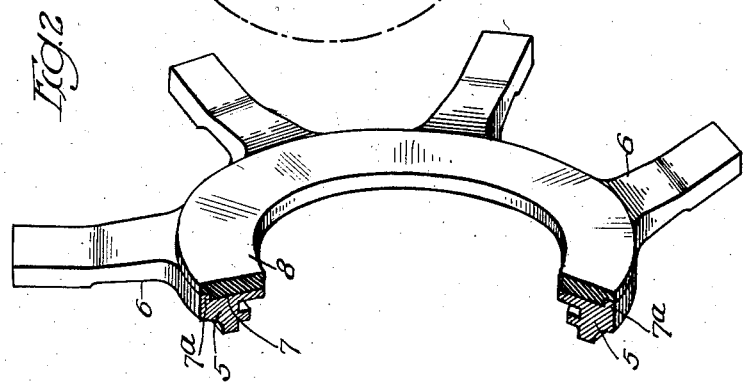
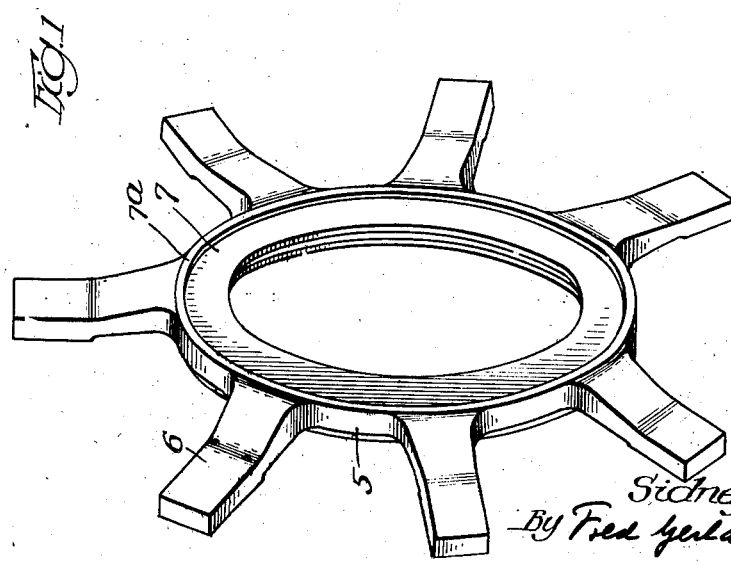

2,381,797

UNITED STATES PATENT OFFICE 2,381,797

METHOD OF BABBITTING

Sidney Adels, Detroit, Mich., assignor to The Aviation Corporation, New York, N. Y., a corporation of Delaware Application June 16, 1943, Serial No. 490,987

1 Claim. (Cl. 22—200.5)

The invention relates to babbitting metal articles.

In fabricating articles such, for example, as locking plates for knuckle pins, Babbitt metal thrust or bearing faces are necessary, as well understood in the art. In centrifugally casting Babbitt metal on the locking plates the Babbitt metal sometimes spatters on the surfaces of the article on which no Babbitt metal should be cast. In parts or articles used in aircraft, the permissible tolerances and contour of the articles are such that any Babbitt metal unintentionally or accidentally deposited or spilled on the article must be removed without producing any surface irregularity on the non-babbitted surfaces. It is also important, when a protective coating is used, to avoid any chemical reaction of the coating on the metal which affects the surface of the article. In articles or parts used in aircraft provided with bearing faces of Babbitt metal, it is of great importance to form the bearing of dense Babbitt metal and with a bearing face which is entirely free of pores.

The several objects of the invention are to provide an improved method of babbitting articles: which includes protecting the surface of the article which is not to be babbitted with a coating which permits the removal of any spilled Babbit without producing any surface irregularities on the article; which effectively coats the article with a mixture which does not chemically react on the surface of the article, effectively prevents spilled Babbitt metal from adhering to the protected surface, and which can be easily removed; which includes protectively coating the article while the Babbitt metal is being centrifugally cast for density with a bearing surface which is free of pores; and which is adapted for babbitting articles in quantity production with minimum rejections on account of irregularities resulting from the babbitting.

Other objects of the invention will appear from the detailed description.

The invention consists in the several novel features which are hereinafter set forth and more particularly defined by the claim at the conclusion hereof.

In the drawing:

Fig. 1 is a sectional perspective of a locking plate before the thrust bearing of Babbitt metal has been cast thereon.

Fig. 2 is a sectional perspective illustrating the ring with the Babbitt bearing cast thereon.

Fig. 3 is a section of an apparatus used for centrifugally casting the Babbitt bearing on the plate.

The invention is exemplified in connection with a locking plate, usually formed of steel, which comprises a ring 5 and radial arms 6. This ring 5 has a suitable side face 7 with an annular flange 7ª for a thrust bearing 8 of Babbitt metal. The article on which the Babbitt is cast may be of different shapes and contour and this ring is an exemplification of such an article.

In carrying out the improved method, the steel locking plate is first degreased and then heated to a temperature of about 350 to 400° F. This may be done by carrying the plates on an endless conveyor through a steel furnace controlled to heat them to said temperature. Next, the plates, while substantially at this temperature, are dipped or immersed in a mixture of water and graphite and shaken to remove any excess of the coating. The mixture consists, preferably, of a solution of one part of 18.2% colloidal graphite and 16 parts of distilled water, or approximately 1.14%. colloidal graphite. Colloidal graphite, commercially known as "Aquadag," is adapted for this purpose. The mixture is kept in a non-metallic container. The mixture of the proportions stated will coat the plates evenly and form a coating of the thickness required for protecting the surface of the article without lumps or bubbles. The heat in the plates will bake the coating on the plate and will dry it in a short period of time. After the locking plate has cooled, the baked coating will not easily rub off and forms a protective coating which will prevent Babbitt metal from adhering to or contacting with the surfaces of the plate.

Next, the protective coating is removed from the surfaces of the ring on which the Babbitt metal is to be cast, which can be quickly done in a lathe.

Next, the usual acid flux is sprayed onto the surface on which the Babbitt is to be cast. The plate is then immersed in a bath of melted virgin tin, removed and given a quick shake, which will cause the tin to be removed from all portions of the plate except the surfaces of the ring from which the protective coating has been removed. Before the plate is sprayed with the acid flux and immersed in the virgin tin, it is warmed in an oven to a sufficient temperature to prevent spitting of the tin.

The plate is then secured in a molding unit for centrifugally casting the Babbitt metal on the plate, as illustrated in Fig. 3. A head 10 is fixed to a driven shaft 11 for rotation therewith and is provided with a cavity 12 of a contour which conforms generally to the exposed face of the bearing to be cast on the plate. The head has a cylindrical pilot shoulder 13 around cavity 12. A portion of the periphery of ring 5 fits the pilot shoulder 13 which centers the ring around the head. The plate is removably secured in the head 10 by a drum 14 which has a side which is adapted to engage the arms 6 on the plate for clamping the plate in the head 10. The drum 14 comprises a flange 15 which fits around the periphery of the head 10 and has bayonet slots 16 for receiving pins 17 on the head and locking the drum on the head with the plate clamped between them. The side wall 14ª of the drum is provided with an opening 18 through which metal is poured into the cavity 12 by a ladle 19 while the head is rotated at approximately 1200 R. P. M. The temperature of the babbitt is maintained at 750° F. and heat is applied to both sides of the rotating unit to maintain a temperature high enough to assure flow of the Babbitt metal so that it will be densified by the centrifugal force to which it is subjected. The side wall 14ª of the drum is provided with openings 20 for flames from gas burners for heating the rotating unit. The heat applied to the mold and plate retards the cooling of the molten Babbitt metal while it is being cast and the unit is rotated until the babbitt has cooled sufficiently to set. The drum 14 is then detached from the head and the babbitted plate is removed from the mold. Any globules of Babbitt metal thrown or splashed onto the coating during the centrifugal casting will not firmly adhere thereto and can be easily brushed off. The protective coating is then removed from the plate by a light blast of sand or hair brush.

Next, the exposed surfaces of the Babbitt thrust bearing are lathe turned at high speed with a very fine feed and carbide tipped tool to produce a highly smooth finished surface on the thrust face of the Babbitt bearing.

A characteristic of this method is that the baked protective coating is of sufficient hardness to prevent splattered Babbitt metal from contacting the steel and to prevent any irregularity in the surface of the steel upon removal of the Babbitt metal, but may be easily removed subsequently to casting the Babbitt metal on the plate. Another characteristic of this method is that there is no chemical reaction of the coating on the steel in the plate so that its surfaces will not be objectionably pitted.

Heretofore articles have been "Parkerized" or immersed in an acid solution for protective coating, but in such practice it was practically impossible to maintain the chemical solution at the desired or uniform strength and variations in duration of immersion sometimes resulted in surface variations on the steel and pitting of the surface due to variations in the chemical reaction of the acid solution on the steel. This resulted in the rejection of many plates for failure to meet the requirements in surface formation and tolerances for aircraft parts.

The invention exemplifies a method of centrifugally casting Babbitt bearings on parts which overcomes the disadvantages of prior methods and which is particularly advantageous in babbitting of aircraft parts.

The invention is not to be understood as restricted to the details set forth since these may be modified within the scope of the appended claim without departing from the spirit and scope of the invention.

Having thus described the invention, what I claim as new and desire to secure by Letters Patent is:

That improvement in babbitting the side face of a ring of metal which comprises, applying to and baking a protective coating on the side face and internal face of the ring, removing the coating from the side face of the ring which is to be babbitted, centrifugally casting Babbitt metal on the side face of the ring, and leaving the coating on the internal surface of the ring during the casting to prevent the spill and splash of the Babbitt metal from adhering to said internal surface.

SIDNEY ADELS.